United States Patent
Carroll et al.

(10) Patent No.: US 9,792,419 B2
(45) Date of Patent: Oct. 17, 2017

(54) STARVATIONLESS KERNEL-AWARE DISTRIBUTED SCHEDULING OF SOFTWARE LICENSES

(71) Applicant: Alcatel-Lucent USA Inc., Murray Hill, NJ (US)

(72) Inventors: Martin D. Carroll, Watchung, NJ (US); William Katsak, Piscataway, NJ (US); Hans C. Woithe, Raritan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 92 days.

(21) Appl. No.: 14/467,488

(22) Filed: Aug. 25, 2014

(65) Prior Publication Data

US 2014/0366162 A1 Dec. 11, 2014

Related U.S. Application Data

(63) Continuation-in-part of application No. 13/207,810, filed on Aug. 11, 2011, now abandoned.

(51) Int. Cl.
    *G06F 9/46* (2006.01)
    *G06F 9/455* (2006.01)
    *G06F 21/12* (2013.01)
    *G06F 9/52* (2006.01)

(52) U.S. Cl.
    CPC ............ *G06F 21/12* (2013.01); *G06F 9/52* (2013.01)

(58) Field of Classification Search
    None
    See application file for complete search history.

(56) References Cited

U.S. PATENT DOCUMENTS

| 5,717,604 | A * | 2/1998 | Wiggins | G06F 21/10 705/412 |
| 7,093,004 | B2 * | 8/2006 | Bernardin | G06F 9/505 707/999.1 |
| 7,231,370 | B1 * | 6/2007 | Kapur | G06Q 10/06 705/50 |
| 2002/0147938 | A1 * | 10/2002 | Hamilton, II | G06F 9/461 714/6.31 |
| 2006/0036554 | A1 * | 2/2006 | Schrock | G06F 21/10 705/75 |

(Continued)

OTHER PUBLICATIONS

"Queue," Anylogic, anylogic.com/anylogic/help/index.jsp?topic=/com.xj.anylogic.help/html/_enterprise/Queue.html., cited in an Office Action dated Jan. 2, 2015, received in connection with U.S. Appl. No. 13/207,810, 4 pgs.

*Primary Examiner* — Bradley Teets
(74) *Attorney, Agent, or Firm* — Chiesa Shahinian & Giantomasi, PC

(57) ABSTRACT

Methods, systems, and apparatuses for implementing shared-license software management are provided. Shared-license software management may be performed by generating a request for a license for running a process of a shared-license software application. The request is communicated to a license server, and the process is made available for scheduling an operation when a grant for the requested license is received from the license server, wherein the grant comprises a license quantum, which is an amount of central processing unit time for which the license has been granted to the process.

23 Claims, 7 Drawing Sheets

(56) References Cited

U.S. PATENT DOCUMENTS

| | | | |
|---|---|---|---|
| 2006/0107046 A1* | 5/2006 | Raley | G06F 21/10 713/168 |
| 2007/0179899 A1* | 8/2007 | Hase | G06Q 10/10 705/59 |
| 2008/0243699 A1* | 10/2008 | Hilerio | G06F 21/105 705/59 |
| 2010/0017517 A1* | 1/2010 | Arai | G06F 9/5077 709/226 |
| 2010/0083255 A1* | 4/2010 | Bane | H04L 51/043 718/101 |
| 2011/0162080 A1* | 6/2011 | Hayami | G06F 21/105 726/26 |
| 2011/0213721 A1* | 9/2011 | Raley | G06F 21/10 705/310 |
| 2012/0198462 A1 | 8/2012 | Cham et al. | |

* cited by examiner

Scenario 1
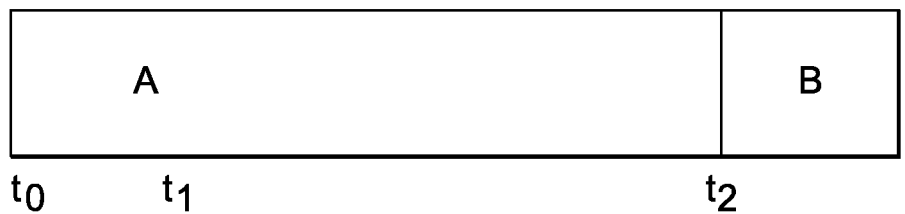
Scenario 2
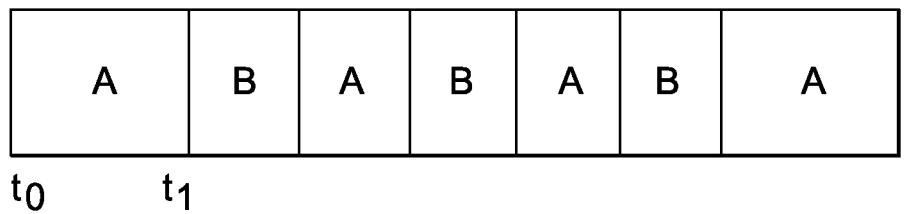
FIG. 1

1. for each process $p$ in $Q$ from front to back
2.    assert: $R_p \neq \emptyset$ and $V \subsetneq R_p$
3.    for each $m \in R_p - V_p$ ← 302
4.      if $m \in F$ ⎫
5.        $F \leftarrow F - \{m\}$ ⎬ 304
6.        $V_p \leftarrow V_p \cup \{m\}$ ⎭
7.    if $V_p = R_p$ ← 306
8.      dequeue $p$ ⎫
9.      create new grant $g$
10.     $L_g \leftarrow V$
11.     $V_p \leftarrow \emptyset$ ⎬ 308
12.     $R_p \leftarrow \emptyset$
13.     send GRANT($p$) to $p$'s client ⎭

*FIG. 3*

REQUEST ($p, \mathcal{L}$) — Process $p$ requests licenses $\mathcal{L}$.
assert: $p \notin Q$
1. $R_p \leftarrow \mathcal{L}$
2. enqueue $p$
3. run GLOBAL_SCHED RETURN($p$) — Process $p$ returns grant $g$.
assert: $p \notin Q$
1. $F \leftarrow F \cup L_g$
2. $L_g \leftarrow \emptyset$
3. run GLOBAL_SCHED

*FIG. 4*

ADD($p, \mathcal{L}$) — Process $p$ adds licenses $\mathcal{L}$ to need set.
1. if $N_p = \emptyset$
2.   send MONITOR to enforcement module
3. else
4.   if $g_p$ is true
5.     send EXPIRE to enforcement module
6. RETURN_GRANT($p$)
7. $N_p \leftarrow N_p \cup \mathcal{L}$
8. send REQUEST($p, N_p$) to server REMOVE($p, \mathcal{L}$) — Process $p$ removes licenses $\mathcal{L}$ from need set.
1. $N_p \leftarrow N_p - \mathcal{L}$
2. if $N = \emptyset$
3.   send UNMONITOR to enforcement module GRANT($p$) — Grant for $p$ is received from server.
1. if $p$ is idle or no longer alive
2.   RETURN_GRANT($p$)
3. else
4.   $g_p \leftarrow$ true
5.   send GRANT to enforcement module EXPIRED($p$) — Process $p$ has consumed grant.
1. RETURN_GRANT($p$)
2. send REQUEST($p, N_p$) to server IDLE($p$) — Process $p$ goes idle.
1. RETURN_GRANT($p$)

NONIDLE($p$) — Process $p$ becomes nonidle.
1. if $N_p \neq \emptyset$
2.   send REQUEST($p, N_p$) to server KILLED($p$) — Process $p$ terminates.
1. RETURN_GRANT($p$)
2. remove $p$ from data structures

*FIG. 5A*

1. if $g_p$ is true
2.    send RET($p$) to server
3.    $g_p \leftarrow$ false

ADD($p$, $\mathcal{L}$) — Process $p$ adds licenses $\mathcal{L}$ to need set.
1. if $Np = \emptyset$
2.     send MONITOR to enforcement module
3. else
4.     if $g_p$ is true
5.         send EXPIRE to enforcement module
6. RETURN_GRANT($p$)
7. $Np \leftarrow Np \cup L$
8. $b \leftarrow$ highest-priority bucket in $Np$
9. send REQUEST($p$, $b$) to $S_b$ GRANT($p$) — Subgrant for $p$ is received from server $s$.
1. if $p$ is idle or no longer alive
2.     RETURN_GRANT($p$)
3. else
4.     $b \leftarrow$ bucket of $Np$ corresponding to $s$
5.     $g_p^b \leftarrow$ true
6.     if $b$ is lowest-priority bucket in $Np$
7.         send GRANT to enforcement module
8.     else
9.         $b' \leftarrow$ next-highest-priority bucket after b in $Np$
10.        send REQUEST($p$, $b'$) to $S_{b'}$ EXPIRED($p$) — Process $p$ has consumed grant.
1. RETURN_GRANT($p$)
2. $b \leftarrow$ highest-priority bucket in $Np$
3. send REQUEST($p$, $b$) to $S_b$ NONIDLE($p$) — Process $p$ becomes nonidle.
1. if $Np \neq \emptyset$
2.     $b \leftarrow$ highest-priority bucket in $Np$
3.     send REQUEST($p$, $b$) to server

*FIG. 7A*

1. for each bucket $b$ of $p$
2.     if $g_p^b$ is true
3.        send RET($p$) to $S_b$
4.        $g_p^b \leftarrow$ false

STARVATIONLESS KERNEL-AWARE DISTRIBUTED SCHEDULING OF SOFTWARE LICENSES

This application is a continuation-in-part of U.S. patent application Ser. No. 13/207,810, filed on Aug. 11, 2011, all of which is hereby incorporated by reference in its entirety.

FIELD OF THE INVENTION

The present invention is generally directed to distributed scheduling of software licenses in a shared-license management system.

BACKGROUND

For multitasking computer systems, the term "starvation" describes the problem condition where a process is denied necessary resources for an extended period of time, or even perpetually. In particular, starvation is a problem for licensed software programs, where client users may have to share a limited number of licenses granting access to a shared-license application. Typically, in such shared-license application systems there are generally three forms of starvation that may occur when two users, A and B, require the use of a shared-license application.

The first form of starvation can be referred to as a greedy running process (GRP). In a GRP scenario, User A may start a long-running license-holding job at time $t_0$. Shortly thereafter, at time $t_1$, user B may want to start a job that needs the same license as user A. Before user B can begin, however, it must wait for a potentially long time (or indefinitely), until user A finishes at time $t_2$.

The second form of starvation can be referred to as a greedy idle process (GIP). The GIP scenario occurs when an application is idle while holding a license. For example, user A may start a license-holding application at time $t_0$ and then stop using the application without terminating it. User B, again wanting to access the application at time $t_1$, must wait for a potentially long time (or indefinitely) until user A terminates the application at time $t_2$.

The third form of starvation can be referred to as a greedy dead process (GDP). If an application holding a license unexpectedly (or expectedly) dies before it gets a chance to return the license, the license will be unavailable until someone—either a user of the system or the license system itself—realizes that the application has died and takes the necessary steps to recover its licenses.

The problem of sharing a limited number of software licenses among a large number of applications is analogous to the classic operating system (OS) problem of sharing limited resources among a potentially large number of processes, while guaranteeing that no process starves waiting for a resource. In the case of software licenses, however, an obstruction to solving the starvation problem at the OS level is that the various machines whose processes share a given license know nothing about the license requirements of processes executing on other machines. Therefore, the end user may have no way to work around a poorly behaving application, short of not executing it in the first place.

SUMMARY

A shared-license software management system and method is proposed. In one embodiment, a request for a license for running a process of a shared-license software application is generated. The request is communicated to a license server, and the process is made available for scheduling an operation when a license grant including the license is received from the license server. A request may be communicated for a plurality of licenses for running the process based on the process's need set (i.e., the set of licenses that the process currently needs). The license grant specifies, either implicitly or explicitly, the licenses for which it is grant; it also explicitly specifies a license quantum, which is the amount of central processing unit (CPU) time that the requesting process has been granted. The license quantum may be larger than the CPU quantum of the client's machine. One or more operations may be performed via a kernel scheduler.

In accordance with an embodiment, the process may be idled. The license grant previously received may be canceled, and the process may be added to a queue maintained for processes waiting for license grants.

In accordance with an embodiment, the amount of time remaining may be decremented when the process has run for a quantum of central processing unit time. The process may be idled and added to a queue maintained for processes waiting for a license if central processing unit time remaining is insufficient for running the process. The process also may be terminated.

In accordance with an embodiment, the process may be determined to be one of expired, killed, idle or nonidle, or idle for longer than a predetermined period of time. A license quantum consumption rate also may be estimated for the process.

In accordance with an embodiment, a plurality of license servers associated with the request are determined, and a plurality of requests for licenses are generated based on a priority order determined for the plurality of license servers, wherein the licenses associated with a license server of the plurality of license servers comprise a license sub-grant. The priority order may be determined such that licenses corresponding to a higher-priority license server are reserved prior to licenses corresponding to a lower-priority license server.

These and other advantages will be apparent to those of ordinary skill in the art by reference to the following detailed description and the accompanying drawings.

BRIEF DESCRIPTION OF THE DRAWINGS

FIG. 1 shows application usage timelines illustrating starvation and non-starvation between users of a shared-license management system;

FIG. 3 is pseudo-code for the global scheduling algorithm;

FIG. 4 is a global scheduler event-processing table that may be used for implementing a shared-license management system;

FIGS. 5A & 5B are a local scheduler event-processing table that may be used for implementing a shared-license management system;

FIG. 6 is a flowchart showing the steps taken for implementing a shared-license management system in a networked computing environment;

FIGS. 7A & 7B are a multi-server local scheduler event-processing table that may be used for implementing a shared-license management system; and FIG. 8 is a high-level block diagram of an exemplary computer that may be used for implementing a shared-license management system.

DETAILED DESCRIPTION

Figure 2:
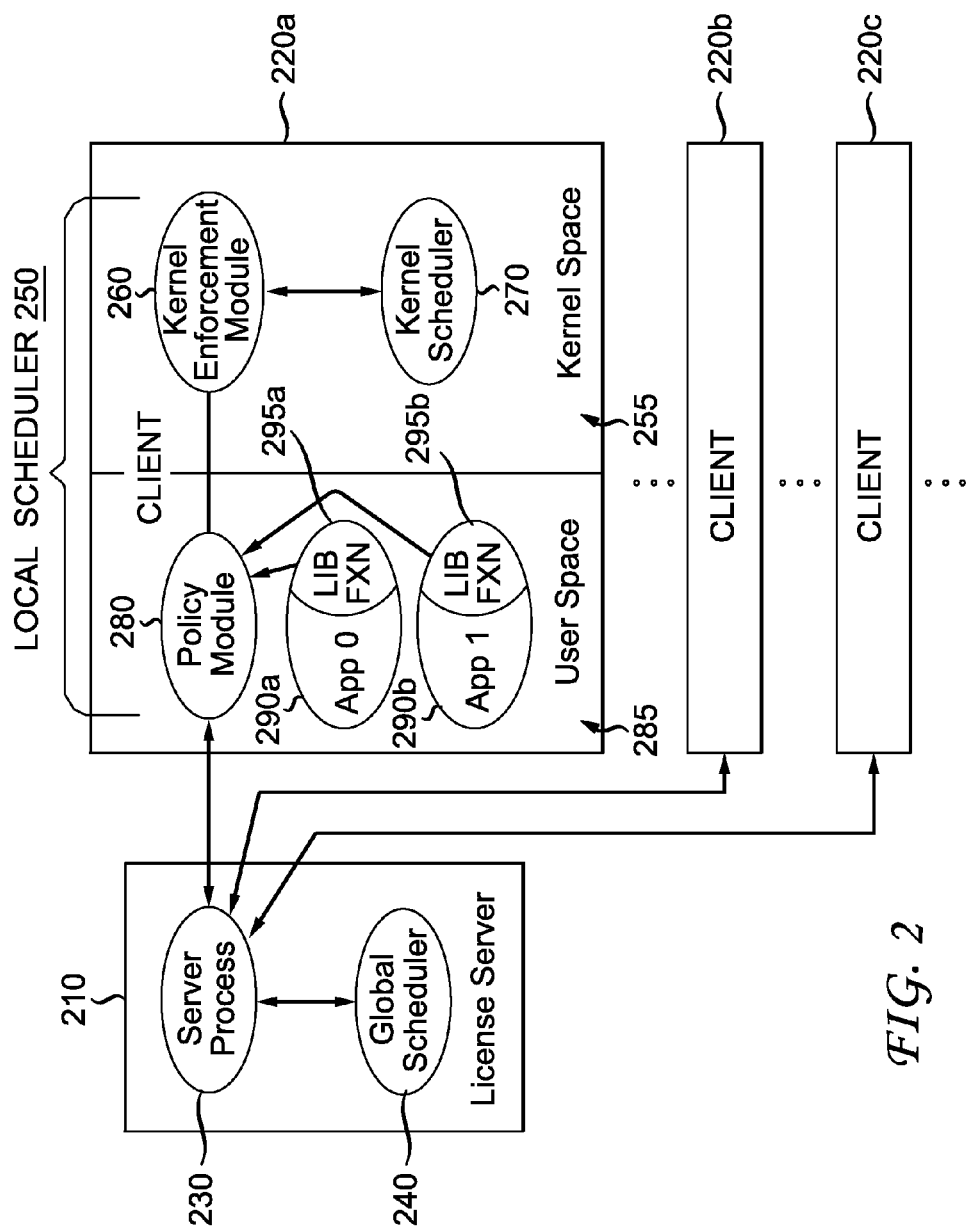
FIG. 2 is an exemplary diagram showing the architecture of a shared-license management system in a networked computing environment according to an embodiment.

A shared-license software management system and method can help to ameliorate the starvation scenarios experienced in check-out, check-in (COCI) based software-license management systems. In this invention, which is a form of a shared-license software management system, application licenses are treated as resources and the license-management system as a single distributed resource scheduler. The shared-license software management system comprises a global scheduler, which runs on a server and schedules licenses to remote processes, and a local scheduler, in communication with the global scheduler, which runs on one or more clients and schedules local processes to client central processing units. It should be noted that the server and client may be located on a same physical machine, in which case the remote processes are on the same machine.

In one embodiment, licensed applications may inform the local scheduler whenever they need a license, or when they are finished needing a license. For example, the local scheduler may establish and dynamically modify a current need set for licensed applications. The local scheduler may then communicate such information to the server-side global scheduler, which decides which applications are given which licenses and when, in a manner, for example, that ensures fairness and prevents starvation and deadlock.

FIG. 1 shows application usage timelines illustrating starvation and non-starvation between users of a shared-license management system. Scenario 1 illustrates the greedy running process (GRP) starvation scenario typically encountered in traditional COCI systems. User A starts a long-running license-holding job at time $t_0$. Shortly thereafter, at time $t_1$, user B wants to start a job that needs the same license as user A. But before user B can begin, it must wait for a potentially long and unbounded time until user A finishes at time $t_2$.

Scenario 2 contemplates the same two users, A and B, where each user requires the use of a shared-license application according to the various embodiments. Again, user A starts a long-running license-holding job at time $t_0$, and shortly thereafter, at time $t_1$, user B wants to start a job that needs the same license as user A. Unlike in Scenario 1, however, as soon as user B wants to start the job, the global scheduler ensures that users A and B timeshare the single license for as long as they both need it.

In one embodiment, the global scheduler may ensure that users A and B timeshare the single license by specifying a license quantum of time, which is the amount of central processing unit (CPU) time that the requesting process has been granted for each license grant. For example, an application may run only if it can run per the existing kernel-scheduler semantics, and if it currently has assigned to it a nonzero remaining license quantum in a grant whose licenses includes all the licenses that the process currently needs. When the remaining license quantum reaches zero, the application may not run until it gets another license quantum, or until the application declares that it no longer needs any licenses.

Further, to prevent a greedy idle process (GIP) scenario, the global scheduler may keep track of how long each process has been idle. For example, when the idle time exceeds a pre-selected value, the global scheduler may force the process to relinquish its license quantum. When the process eventually wakes up (i.e., becomes non-idle), the global scheduler may then reissue the needed licenses to the process. Moreover, whenever an application holding a license terminates (normally or unexpectedly) before it gets a chance to return a license, the global scheduler may automatically relinquish the process's remaining license quantum, thereby preventing a greedy dead process (GDP) scenario.

The architecture of the shared-license management system according to the various embodiments is shown in FIG. 2. The system 200 comprises a license server 210 and one or more clients 220a-c. The license server 210 is in communication with the one or more clients 220a, and can perform the job of scheduling the distribution of available licenses among the one or more clients 220a-c that need them.

The license server 210 comprises a server process 230 and a global scheduler 240, both in user space. In one embodiment, the server process 230 may call the global scheduler 240 in response to a license request received from the one or more clients 220a-c. The global scheduler 240, in response to a call from the server process 230, may then schedule and grant licenses (i.e., quanta of CPU time) to the remote client processes.

Each client 220a-c in communication with the license server 210 comprises a local scheduler 250. The local scheduler 250 schedules local processes to client CPUs. In one embodiment, the local scheduler 250 may be adapted to run in the existing client kernel space 255, known as an invasive implementation. In an invasive implementation, a small number of kernel modifications (also known as hooks) are inserted into an existing kernel scheduler. The kernel modifications may be portable for use in a variety of operating systems or versions of operating systems. Further, local scheduler 250 may export one or more global symbols for the kernel modifications to hook onto.

In order to minimize the number of existing kernel modifications, the local scheduler 250 may be implemented in two parts: a loadable enforcement kernel module 260 (also referred to herein as enforcement module 260) that communicates with a modified version of a kernel scheduler 270 that is typically present in the client kernel space 255; and a policy module 280 in user space 285 that enables the local scheduler 250 to communicate with the server 210. Each licensed application 290a-b running in user space 285 that wishes to obtain a license may compile and link to a respective library function 295a-b. For example, when an application, e.g., application 290a needs a license, it may call a library function 295a and pass the library function 295a the known identifier for the license. The library function 295a may then write the corresponding license request to a device file owned by the policy module 280. Additional functions of library function 295a-b are also contemplated, such as, e.g., a function for removing a license, etc.

Alternatively, the local scheduler 250 may be adapted to run in a noninvasive implementation in which no part of the existing client kernel space 255 or other system software is modified. The noninvasive implementation is similar to the invasive implementation, except that the kernel scheduler 270 is not modified and the enforcement module 260 includes a worker-thread that periodically checks client processes to determine whether any client process has consumed its license grant. One skilled in the art will appreciate that the worker-thread period may be chosen to balance license fairness with CPU occupancy with shorter periods tending to increase fairness at the cost of somewhat lower CPU occupancy for the licensed processes.

In an embodiment, the noninvasive implementation of the enforcement module 260 may estimate a license quantum consumption rate for a client process, e.g., by determining an estimated time in the future at which each client process will use up its license quantum. Then instead of periodically checking all client processes, the enforcement module 260 may schedule a worker-thread to wake up just before an estimated time of the earliest estimated license quantum consumption. As such, the odds of license-grant over-consumption are reduced and the likelihood of higher CPU occupancy for the licensed processes is increased.

The global scheduler 240 comprises a global scheduling algorithm that may use an "any-out" variant of first-in-first-out (FIFO) ordering to establish a license-reservation queue. In the any-out ordering variation, the global scheduler 240 may only add processes to the rear of the queue, but is able to remove processes from anywhere in the queue. Moreover, once a process is in the queue, it is never moved with respect to the other processes in the queue.

The global scheduler 240 employing the any-out ordering variation maintains a queue, Q, for client processes that are waiting for grants for licenses. In one embodiment, the global scheduler 240, when invoked, may attempt to reserve all the needed-but-not-yet-reserved licenses for all the processes in the queue, starting at the front of the queue. Licenses that cannot be reserved in a present scheduler invocation (e.g., the needed license is reserved by a process higher-up in the queue) may be skipped to eventually be reserved in a future invocation. When a process's reservations finally matches its request set, the global scheduler 240 removes that process from the queue and issues that process a (single) grant for the particular ensemble of licenses in the request set. When the process eventually returns the (fully or partially consumed) grant to the server 210, the licenses in that grant's ensemble again become available for reservation, and the global scheduler 240 adds the process to the rear of the queue if the process is still requesting one or more licenses. Further, the global scheduler 240 may clear out all of a process's reservations, wherever they are in the queue, when the scheduler determines that a process has become idle (i.e., to prevent a GIP scenario).

As such, for each process, p, the global scheduler 240 may maintain a reqyest set, Rp, consisting of the global scheduler's 240 current view of the process's need set. The global scheduler 240 may also maintain a reservation set, Vp, consisting of those licenses that are currently reserved to p. If a process is not in the queue, then Vp is empty. A free set, F, containing all licenses that the server 210 owns but are not currently reserved to any process or in use by any client is also maintained by the global scheduler 240. Therefore, Vp and F contain licenses, and Np contains license needs.

For each issued grant, g, the global scheduler 240 may maintain an ensemble, Eg, consisting of the licenses for which g was granted. The global scheduler 240 may maintain a granted set G containing all those processes that currently have an outstanding grant. As such, at any given time a given process, p, can be in either set Q or set G, but not both.

Given the sets Q and G, an invocation of the global scheduling algorithm, GSCHED, works as shown in the pseudo-code of FIG. 3. For each process p in Q, at step 302, the global scheduler determines the set Rp-Vp consisting of those licenses that p is requesting but have not yet been reserved. For each such license, if it is currently free, it is reserved at step 304. If these reservations complete p's request, at step 306, then p is de-queued, its reservations and request are cleared out, and is issued a grant at step 308.

The server may handle various asynchronous events as illustrated by the pseudo-code event tables in FIG. 4. These events are sent by the local scheduler on some client machine. All incoming events are queued in an event queue and processed one at a time in the order in which they arrive. When a process p requests a grant, the distributed algorithm guarantees that p cannot already have a grant or outstanding request. The distributed algorithm refers to the distributed protocol plus event-processing logic that the system uses, and that is described below. Hence, the server initializes Rp, enqueues p, and runs GSCHED. When a grant g is returned, the server transfers its licenses to the free set and runs GSCHED.

The local scheduler 250 is logically implemented via the joint action of the policy module 280, which implements scheduling policy including determining which licenses to request, when to request licenses, and which processes to prevent from running because they lack needed licenses, and the enforcement module 260 and kernel scheduler 270, which together implement a mechanism for schedule enforcement.

An invasive implementation of the enforcement module 260 maintains, for each process p being monitored, the unconsumed quanta of CPU time tp remaining in the process's current license grant. If the unconsumed CPU time tp is nonzero, the enforcement module 260 allows the kernel scheduler 270 to make the process available for scheduling an operation. If the unconsumed CPU time tp is zero, there is insufficient CPU time for running the process and the enforcement module 260 adds the process to a queue, which prevents the kernel scheduler 270 from making the process available for scheduling an operation.

Whenever the kernel scheduler 270 causes process p to run for another CPU quantum of time, the enforcement module 260 decrements tp. When tp≤zero, the enforcement module 260 adds the process to an internal queue and sends an EXPIRED event to the policy module 280.

In an embodiment, the policy module 280 maintains for each process p (that is linked against library function 295), p's need set Np, and also a Boolean value gp which is true if p currently has a grant.

The policy module 280 handles the asynchronous events shown in FIG. 5A. The ADD and REMOVE events are sent by library function 295; the GRANT event is sent by the server 210; and the remaining events are sent by the enforcement module 260. All incoming events are processed one at a time in the order in which they arrive.

For the ADD event, when a process p adds more licenses L to its need set, the policy module 280 first determines whether process p's need set is currently empty. If so, the policy module 280 sends a communication to the enforcement module 260 to begin monitoring p. If process p's need set is not currently empty, the policy module 280 sends a communication the enforcement module 260 to expire any outstanding license grant, because the current license grant no longer covers all needed licenses. The policy module 280 next returns any outstanding license grant to the server 210 by calling the RETURN GRANT function, shown in FIG. 5B. The policy module 280 then updates the need set for p and sends a request for the new need set to the server 210.

The REMOVE event illustrates that when a process removes licenses from its need set, the policy module 280 updates the need set. If the new need set is empty, the policy module 280 sends a communication to the enforcement module 260 to stop monitoring the process. For this event, the policy module 280 does not expire any outstanding license grant, because the outstanding license grant still covers all needed licenses.

For the GRANT event, when a license grant arrives from the server 210 the policy module 280 determines whether the intended process is idle or no longer alive. If either is the case, the policy module 280 returns the license grant to server 210, because the license grant is no longer needed. Otherwise, the policy module 280 sends the grant to the enforcement module 260.

For the EXPIRED event, when a license grant expires (e.g., because the process has consumed it), the policy module 280 returns the license grant to server 210.

For the IDLE event, when a process has been idle for a configurable amount of time, the policy module 280 returns any outstanding grant. When the process eventually becomes non-idle, the policy module requests a grant, if one is needed, as shown in the NONIDLE event.

For the KILLED event, when a process terminates, the policy module 280 adds the process to an internal queue and returns any outstanding grant to the server 210 and removes the process from its data structures.

Figures 5B, 6:
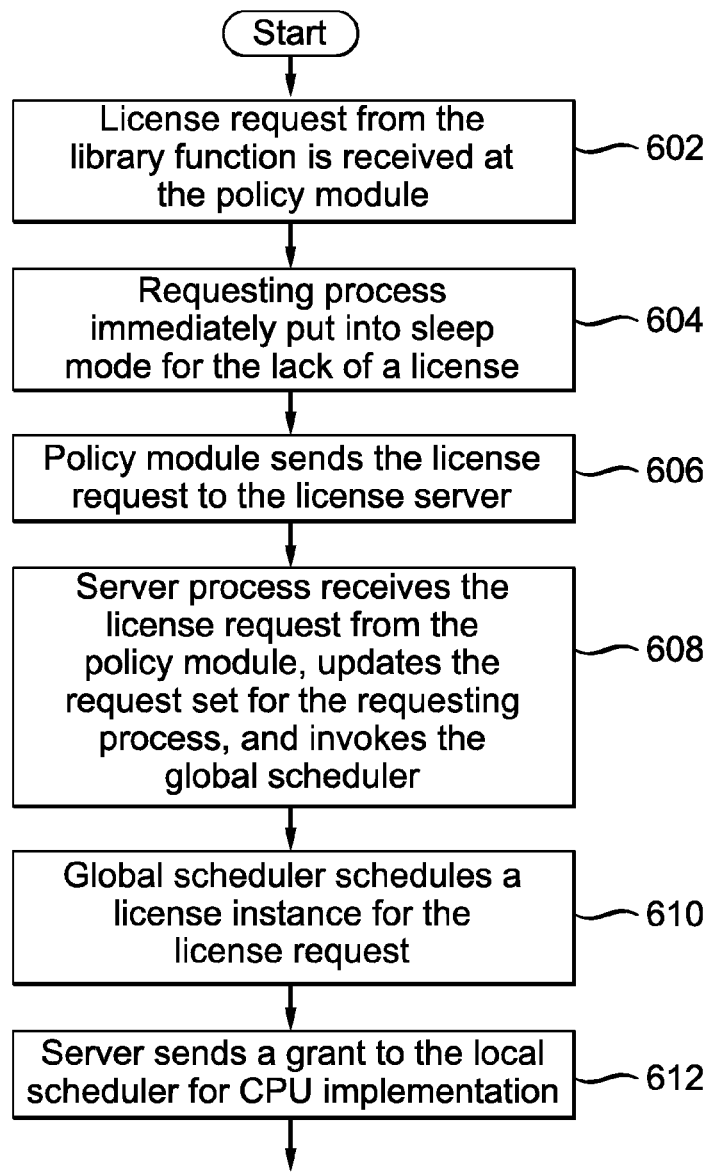

FIG. 6 is a flowchart showing the steps taken for implementing a distributed license management system according to the various embodiments. When the license request from the library function 295 is received at the policy module 280 portion of the local scheduler 250 at step 602, the local scheduler 250, at step 604, causes the requesting process to be immediately put into sleep mode for the lack of a license.

At step 606, the policy module 280 sends the license request to the license server 210. The policy module 280 may be in communication with the license server 210 via, for example, a high-speed LAN or other wired or wireless communications link.

At step 608, the server process 230 receives the license request from the policy module 280 and invokes the global scheduler 240. As described above, the global scheduler 240 maintains a data structure that lists the request set for every process on every connected client machine. For example, when the server 210 receives a process's license request, at step 608 the global scheduler 240 updates the request set for the requesting process. The global scheduler may then schedule a grant, which specifies a license quantum, for the license request based on the request set maintained in the data structure at step 610. In various embodiments, a single license quantum allocation may be good for a particular license request or, in the alternative, a particular ensemble of licenses that are currently contained in the process's request set. When all of the licenses for the process's request set are obtained, at step 612, the server 210 sends a grant to the local scheduler 250 for CPU implementation.

In one embodiment, once the global scheduler 240 issues a grant, it will not issue another grant to that process until the process is done with the outstanding grant or the process is deemed ide, in either case of which the outstanding grant is returned to the server. For example, the local scheduler 250 may maintain, for each process executing on that machine, the process's need set and whether that process has an outstanding grant. If the latter is true, then the local scheduler 250 may also record the remaining unused license quantum. When the local scheduler 250 receives the grant, it updates the process's unused license quantum, and the process may run per, for example, the OS scheduling algorithm. Each time the process receives a share of the CPU, the local scheduler 250 decrements the process's unused license quantum. If the unused quantum become zero as a result, the process may again cease to run, and the local scheduler 250 may return the grant to the server 210. Eventually, the server 210 may issue the process a new grant, and the process will once again be able to run.

If a licensed software application needs an additional license, the process may return to step 602 in which the application calls a library function, in which the local scheduler 250 may add to the process's need set and, after the process is put into sleep mode at step 604, the relevant information is processed at the server 210 as in steps 608 to 614. If the process has an outstanding grant, the local scheduler 250 may return it to the server 210, because that grant no longer covers all licenses in the need set.

In one embodiment, when an application no longer needs a license, the application calls a library function to pass the relevant information to the policy module of the local scheduler, which remove that license from the process's need set. Further, when the local scheduler 250 determines that a process has been idle for longer than a configurable GIP period, the local scheduler 250 may return any outstanding grant to the server 210 and may inform the server 210 that the process has become idle. The global scheduler 240 may not issue any grants to idle processes during the idle period. When the process becomes non-idle, the local scheduler 250 may inform the server 210, which may then resume issuing grants to the process in the manner described above.

When a process terminates for any reason, both schedulers may remove that process from their data structures. As such, the license server 210 may be configured to periodically monitor the status of connected clients and their processes. For example, the server process 230 may run the global scheduler 240 whenever the set of connected clients 220 changes and whenever a process executing on a client 220 requires that the global scheduler 240 be run—such as whenever a process returns a grant, changes its need set, changes its idle state, or terminates. As soon as the server process 230 learns of these events, it may re-run the global scheduler 240 and communicate the results to the clients 220.

In another embodiment, if the local scheduler 250 encounters a network partition, e.g., the client 220 becomes temporarily disconnected from the license server 210, both license requests and consumed licenses may not be immediately returned to the server 210. Rather, the local scheduler 250 may queue license requests and consumed license grants at the client 220 until network connectivity is restored.

Oftentimes, shared-license software systems comprise multiple license servers, each serving (typically) different sets of licenses. Also, many existing applications use only a small number of licenses (typically one), and are uni-server applications, i.e., all the licenses that the application needs are served by a single license server, of the multiple license servers. If all the applications that are using a given collection of license servers are uni-server applications, whenever the application adds a license to its need set, the policy module 280 searches the license servers in an application's license-server list to find the license server that serves that license. The policy module 280 may then logically associate that license server's identity to the needed license to reduce the need for further probing.

In other instances, an application may be a multi-server application that requires licenses from more than one server. For example, server R may serve one instance of license A, server S serves one instance of license B, and processes P0 and P1 each need both licenses. Hypothetically, if R were to grant license A to P0, and S grant license B to P1, then neither process could run, and the shared-license software system would be deadlocked.

To prevent such a deadlock from occurring, an additional level of reservation ordering may be employed. In an embodiment, a priority order of the plurality of license servers is determined, and licenses in an application's need set are reserved in an order that corresponds to the license server priority order. For example, consider the need set $\{A_R, B_R, C_S, D_T\}$ containing four licenses, the first two of which are served by license server R, the next by license server S, and the last by server T. Suppose that in the license server priority order, R comes before S, which comes before T. To reserve the licenses in this need set, a multi-server version of policy module 280 first generates a request to license server R to reserve licenses A and B, next generates a request to license server S to reserve license C, then generates a request to license server T to reserve license D. When each license server reserves its associated licenses, the server issues to the requesting process a sub-grant for its share of the licenses in the process's need set.

A multi-server version of the policy module 280 stores, for each process p, p's need set Np. Further, policy module 280 partitions Np into buckets, where each bucket contains the licenses for a particular license server. The policy module 280 also sorts the buckets in a priority order corresponding to the globally-agreed-upon server order, where bucket a is a higher priority than bucket b if bucket a's license server is a higher-priority license server than bucket b's license server in the server priority order. Finally, for each bucket b, policy module 280 maintains a Boolean value gbp which is true if policy module 280 has received (and not yet returned) a sub-grant for the licenses in that bucket.

Figures 7B, 8:
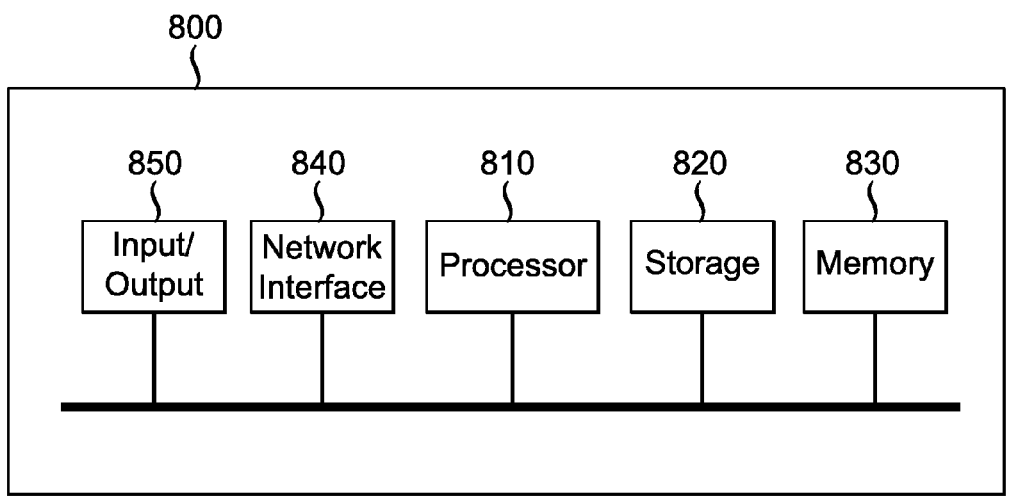

The multi-server version policy module 280 handles the same events as the policy module 280 described above, and processes those events in the same way, except that the multi-server version policy module 280 requests sub-grants in server order. The multi-server version policy module 280 ADD, GRANT, EXPIRED and NONIDLE processing events are shown in FIG. 7A. The REMOVE, IDLE, and KILLED events are handled the same as in FIG. 5A. To ensure that reservation order is adhered to, requests for licenses are always sent in bucket-priority order, and when the multi-server version policy module 280 receives a sub-grant, it determines whether there are any more (lower-priority) buckets that need a sub-grant. The other event handlers similarly perform their operations in priority order, on all buckets. The multi-server version of RETURN GRANT is shown in FIG. 7B.

The above-described methods may be implemented on a computer using well-known computer processors, memory units, storage devices, computer software, and other components. A high-level block diagram of such a computer is illustrated in FIG. 8. Computer 800 contains a processor 810, which controls the overall operation of the computer 800 by executing computer program instructions which define such operation. The computer program instructions may be stored in a storage device 820 (e.g., magnetic disk) and loaded into memory 830 when execution of the computer program instructions is desired. Thus, the steps of the method of FIGS. 3, 4A, 4B, 5A, 5B, 6, 7A and 7B may be defined by the computer program instructions stored in the memory 830 and/or storage 820 and controlled by the processor 810 executing the computer program instructions. The computer 800 may include one or more network interfaces 840 for communicating with other devices via a network for implementing the steps of the method of FIGS. 3, 4A, 4B, 5A, 5B, 6, 7A and 7B. The computer 800 may also include other input/output devices 850 that enable user interaction with the computer 800 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A system, comprising:
    a memory; and
    a processor in communication with the memory, the processor configured to:
        execute a local scheduler as a hook into an existing kernel scheduler of a client device, wherein the local scheduler is configured to:
            receive a set of license needs for running a process of a shared-license software application on a client device, the set of license needs comprising license needs served by different ones of a plurality of license servers;
            partition the set of license needs into buckets, each bucket associated with one of the plurality of license servers, wherein each license need is partitioned into the bucket that is associated with the license server from which the license need is served;
            determine a priority order for the buckets based on a priority of their associated license server;
            generate requests for the license needs in each bucket according to the priority order such that a grant for a request for a license need in a particular bucket is received from its respective license server prior to generating a request for a license need in a next bucket in the priority order;
            communicate each of the generated requests to its respective license server;
            receive a respective grant for each of the generated requests from its respective license server, wherein the respective grant comprises a license quantum representing an amount of central processing unit (CPU) time which has been granted to the process; and
            schedule the process of the shared-license software application for running on the client device when the respective grant for each of the generated requests is received and when the process of the shared-license software application is permitted to run based on semantics of the existing kernel-scheduler.

2. The system of claim 1, wherein the local scheduler is further configured to:
    idle the process;
    cancel at least one respective grant; and add the process to a queue maintained for processes waiting for one or more respective grants.

3. The system of claim 1, wherein the local scheduler is further configured to decrement an amount of remaining license quantum for running the process by a quantum of time when the process has run for the quantum of time.

4. The system of claim 3, wherein the local scheduler is further configured to:
idle the process; and
add the process to a queue maintained for processes waiting for one or more respective grants if the amount of remaining license quantum is insufficient for running the process.

5. The system of claim 1, wherein the local scheduler is further configured to generate the requests based on the set of license needs.

6. The system of claim 1, wherein the local scheduler is further configured to determine whether the process is one of expired, killed, idle or nonidle.

7. The system of claim 1, wherein the local scheduler is further configured to determine whether the process is idle for longer than a predetermined period of time.

8. The system of claim 1, wherein the local scheduler is further configured to cancel at least one respective grant.

9. The system of claim 1, wherein the local scheduler is further configured to perform one or more operations via a kernel scheduler.

10. The system of claim 1, wherein the local scheduler is further configured to estimate a license quantum consumption rate for the process.

11. The system of claim 1, wherein the requests for license needs are generated such that requests for license needs of a bucket having a higher priority in the priority order are generated prior to requests for license needs of a bucket having a lower priority in the priority order.

12. A method comprising:
executing a local scheduler as a hook into an existing kernel scheduler of a client device:
receiving, by the local scheduler, a set of license needs for running a process of a shared-license software application on a client device, the set of license needs comprising license needs served by different ones of a plurality of license servers;
partitioning, by the local scheduler, the set of license needs into buckets, each bucket associated with one of the plurality of license servers, wherein each license need is partitioned into the bucket that is associated with the license server from which the license need is served;
determining, by the local scheduler, a priority order for the buckets based on a priority of their associated license server;
generating, by the local scheduler, requests for the license needs in each bucket according to the priority order such that a grant for a request for a license need in a particular bucket is received from its respective license server prior to generating a request for a license need in a next bucket in the priority order;
communicating, by the local scheduler, each of the generated requests to its respective license server;
receiving, by the local scheduler, a respective grant for each of the generated requests from its respective license server, wherein the respective grant comprises a license quantum representing an amount of central processing unit (CPU) time which has been granted to the process; and scheduling, by the local scheduler, the process of the shared-license software application for running on the client device when the respective grant for each of the generated requests is received and when the process of the shared-license software application is permitted to run based on semantics of the existing kernel-scheduler.

13. The method of claim 12, further comprising:
idling the process;
canceling at least one respective grant; and
adding the process to a queue maintained for processes waiting for one or more respective grants.

14. The method of claim 12, further comprising decrementing an amount of remaining license quantum for running the process by a quantum of time when the process has run for the quantum of time.

15. The method of claim 14, further comprising:
idling the process; and
adding the process to a queue maintained for processes waiting for one or more respective grants if the amount of remaining license quantum is insufficient for running the process.

16. The method of claim 12, wherein generating the requests comprises generating the requests based on the set of license needs.

17. The method of claim 12, further comprising determining whether the process is one of expired, killed, idle or nonidle.

18. The method of claim 12, further comprising determining whether the process is idle for longer than a predetermined period of time.

19. The method of claim 12, further comprising canceling at least one respective grant.

20. The method of claim 12, further comprising performing one or more operations via a kernel scheduler.

21. The method of claim 12, further comprising estimating a license quantum consumption rate for the process.

22. The method of claim 12, wherein the requests for license needs are generated such that requests for license needs of a bucket having a higher priority in the priority order are generated prior to requests for license needs of a bucket having a lower priority in the priority order.

23. An article of manufacture including a non-transitory computer-readable medium having instructions stored thereon, that in response to execution by a computing device causes the computing device to perform operations comprising:
executing a local scheduler as a hook into an existing kernel scheduler of a client device;
receiving, by the local scheduler, a set of license needs for running a process of a shared-license software application on a client device, the set of license needs comprising license needs served by different ones of a plurality of license servers;
partitioning, by the local scheduler, the set of license needs into buckets, each bucket associated with one of the plurality of license servers, wherein each license need is partitioned into the bucket that is associated with the license server from which the license need is served;
determining, by the local scheduler, a priority order for the buckets based on a priority of their associated license server;
generating, by the local scheduler, requests for the license needs in each bucket according to the priority order such that a grant for a request for a license need in a particular bucket is received from its respective license server prior to generating a request for a license need in a next bucket in the priority order;

communicating, by the local scheduler, each of the generated requests to its respective license server;

receiving, by the local scheduler, a respective grant for each of the generated requests from its respective license server, wherein the respective grant comprises a license quantum representing an amount of central processing unit (CPU) time which has been granted to the process; and scheduling, by the local scheduler, the process of the shared-license software application for running on the client device when the respective grant for each of the generated requests is received and when the process of the shared-license software application is permitted to run based on semantics of the existing kernel-scheduler.

* * * * *